April 11, 1961  J. NOALL  2,979,091
QUICK ACTING TIRE MOUNTING CHUCK
Filed Dec. 31, 1958  2 Sheets-Sheet 1

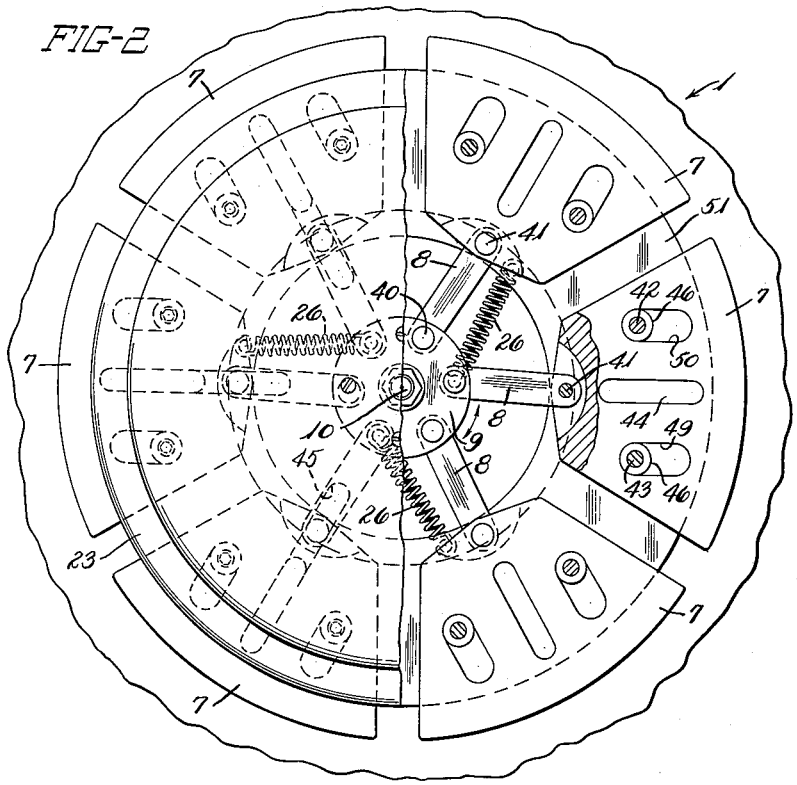

United States Patent Office 2,979,091
Patented Apr. 11, 1961

2,979,091

QUICK ACTING TIRE MOUNTING CHUCK

John Noall, Cuyahoga Falls, Ohio, assignor to The Firestone Tire & Rubber Company, Akron, Ohio, a corporation of Ohio Filed Dec. 31, 1958, Ser. No. 784,327

8 Claims. (Cl. 144—288)

This invention relates to a device for mounting and inflating tires and more particularly to an expansible chuck for mounting inflated pneumatic tires in order to perform various operations on them.

In the manufacture of pneumatic tires it is often necessary to mount and inflat a tire in order to perform such operations as buffing the sidewall or cutting or lacerating the tread with a siping machine. Mounting a tire on a standard automobile or truck rim, although not an involved operation, requires more time and effort than can be economically spared in a tire factory producing thousands of tires a day. For that reason, many attempts have been made to adapt rims to the quick mounting of tires or to use collapsible rims or rims having separable sections which may be quickly assembled and the tire inflated thereon. These and other attempts to quickly mount and inflate a tire have not been completely satisfactory for a number of reasons.

The present invention attains the desired result by use of a radially expansible and contractable member supporting one of the beads of the tire cooperating with an annular inflatable member to form with the tire and other members a chamber sealed against the escape of air.

More specifically, the present invention attains the desired result by the use of a cylindrical base member adapted to seat one of the beads of a tire. A second continuous bead seat is provided for the other bead by an annular disc having expansible and retractable segments to permit the tire to seat on the chuck and to retain said other bead against axial displacement when the tire in inflated. While the first named bead is sealed against the escape of air by its continuous bead seat, the other bead is sealed against the escape of air from the tire chamber by an annular inflatable member.

It is, therefore, an object of this invention to provide means for quickly mounting and inflating a pneumatic tire. It is also an object of this invention to provide a device for quickly sealing the beads of a pneumatic tire against the escape of inflation air. Yet, a further object of the invention is to provide means for sealing one bead of a pneumatic tire and inflatable means for sealing the other bead of the tire against the escape of air.

Another object of the invention is to provide a continuous cylindrical base member for partly bridging the gap between the beads of the tire and which cooperates with a radially adjustable member for supporting the other bead of the tire as well as with an inflatable member which, upon inflation, bridges and seals that portion of the gap between the beads of the tire not bridged and sealed by the first named member.

These and other objects of the invention will be more readily understood with reference to the specification, claims and drawings of which:

Figure 2 is a plan view of Fig. 1.

Figure 1:
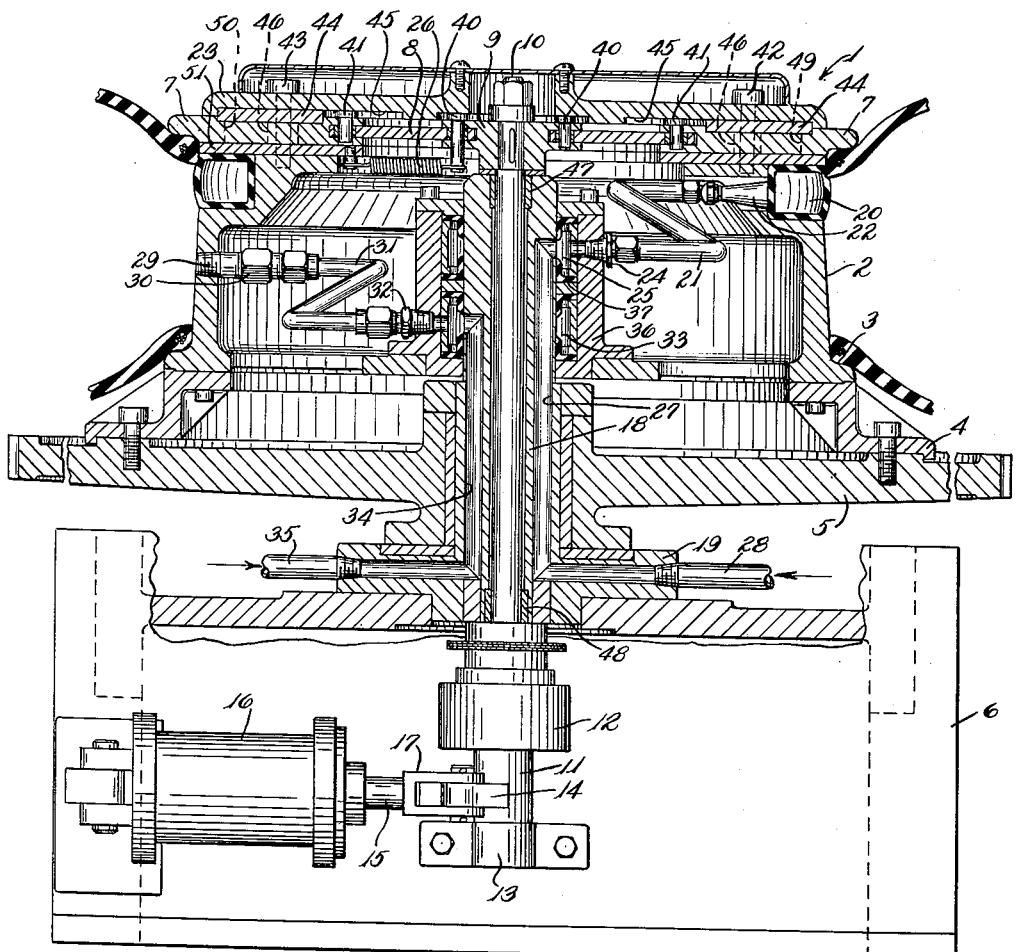
Figure 1 is a side elevation partly broken away and in section of the apparatus of the invention.

With reference to the drawings and particularly Figures 1 and 2, an adjustable chuck generally indicated at 1 comprises an annular base 2, having an annular tire bead supporting flange 3 mounted on an adapter ring 4 which is supported by base plate 5 resting on stand 6.

Six segmented bead holders 7 (Fig. 2) are mounted between top plate 23 and ring 51 and adapted for radial movement through attachment on the radial inner edge to link 8 by pivot pin 41. The other end of link 8 is attached by pivot pin 40 to center flange 9, which is adapted for rotation with shaft 10. The shaft 10 is actuated by a chain and sprocket assembly connecting shaft 10 with shaft 11. Shaft 11 having its upper portion in bearing 12 and its lower end in bearing 13, is partially rotated by the action of air cylinder 16 having piston rod 15 which pivots lever arm 14 attached to clevis 17 at one end and to shaft 11 at the other end.

Shaft 10 is mounted in, and supported by bearings 47 and 48 in center post 18 which has a base 19 resting on a portion of stand 6.

For sealing the upper bead of the tire an annular inflatable member 20 is retained within recess in base 2 and is adapted for inflation through a valve 22 connected with air hose 21 communicating with an annular chamber 25 through fitting 24. The chamber 25 is gasketed against the escape of air by two annular leather seals such as 37 and communicates with a passage 27 running down center post 18 and through base 19 to air pipe 28 connected to a source of high pressure air not shown.

For inflating the tire the base 2 receives nipple 29 attached to fitting 30 and air hose 31 having a fitting 32 at its other end in body 36. A second annular chamber 33 communicates with fitting 32 and passage 34 which, in turn, is connected to pipe 35 of another high pressure air line. It will be seen that pipe 28 through its associated connections makes possible the inflation of the inflatable member 20 while pipe 35, through its associated connections, makes possible the inflation of the tire.

Referring to Fig. 2, the device has six bead holders, such as 7, attached to the shaft 10 through links 8 and center flange 9. Each bead holder 7 has two slots 49 and 50 which permits substantial radial movement of the bead holder with respect to screws 42 and 43 mounting bushings 46, which anchor top plate 23 to the annular base 2 (see Fig. 1). Each bead holder 7 is held in position with respect to the top plate 23 by a key 44 which is shorter than a key way in top plate 23 to permit it to ride therein as the bead holder moves radially. Three springs are each attached at one end to the ring 51 and at the other end to a pin 40 on center flange 9 to resiliently position the various parts as the shaft 10 is twisted.

It will be seen that as the air cylinder 16 is actuated, shaft 10 is twisted to pivot center flange 9 with respect to the arms 8 so that the bead holders 7 are drawn radially inward with the keys 44 and the bushings 46 on screws 42 and 43 sliding in their respective slots to keep the bead holders in alignment. The result of this action is a segmented disc of less diameter than the bead of the tire to be mounted.

The modification of the invention shown at Fig. 3 makes provision for insuring that the upper bead 62 of the tire does not move axially below the inflatable member 67 before it is inflated. If this movement were to occur, the inflatable member would bulge out between the bead 62 and the bead holder 7 and the tire would not properly mount when inflated.

In this modification of the invention a pawl 63 is pivoted about pin 64 and biased radially outwardly with respect to the tire by spring 66. Radial inner movement of the pawl is limited by stop 65.

Figure 3:
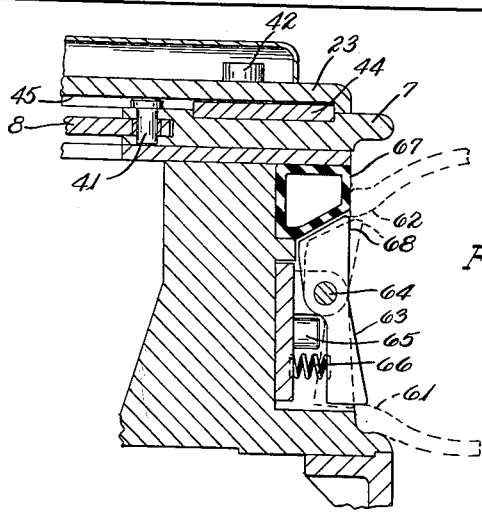
Figure 3 is an enlarged fragmentary sectional view of a modification of the invention.

In operation of this modification of the invention, before the tire is placed on the chuck, the pawl 63 takes the position shown by the solid line in Fig. 3. The bead holder 7 is retracted radially and the lower bead 61 is slipped axially thereover and down the chuck until it contacts the lower surface of the pawl, thereby pivoting the pawl about pin 64 and against spring 66 to bring the end 68 radially outward to limit the axial displacement of the tire bead 62. Inflation of the inflatable member 67 with inflation of the tire seats the bead 62 in its proper position against bead holder 7.

*Operation of the device*

In operation of the device, the action of air cylinder 16 twists shaft 10 to rotate flange 9, in effect, shorten arms 8, drawing the six bead holders 7 radially inwardly to form a segmented disc of a diameter less than the diameter of the bead of the tire 60. The tire is then slipped axially over the bead holder 7 and onto base 2 so that the lower bead is seated against flange 3. Air cylinder 16 is then actuated in the reverse sense to twist shaft 10 in the opposite direction to rotate flange 9 and, in effect, lengthen arms 8 to move the six bead holders 7 radially outwardly to a position shown in Figures 1 and 2.

In this position the six bead holders are spaced circumferentially from each other with portions on their lateral faces separated by gaps. This structure would permit escape of inflation air from a tire if it were not for inflatable member 20. Through appropriate controls not shown, air at about 30 p.s.i. is introduced slowly through pipe 35, passage 34 and air hose 31 into the tire cavity to inflate the tire and force the tire beads axially against flange 3 and the bead holders 7. Air also is introduced through pipe 28, passage 27 and air hose 21 into member 20, which is expanded against the toe of the bead of the tire which has seated against bead holder forming a circumferential seal completely around the bead. The work operation, such as buffing the sidewall, is then performed on the tire after which the inflation air is permitted to escape through hose 31, the member is deflated through hose 21, air cylinder 16 is actuated to twist shaft 10 in the reverse sense to move bead holder 7 radially inwardly and the tire is lifted axially from the chuck to complete the operation.

While certain representative embodiments have been shown for purpose of illustration, it will be apparent to those skilled in the art that various changes and modifications may be made without departing from the spirit of the invention.

What is claimed is:

1. A quick acting device for mounting and inflating a pneumatic tire comprising annular means seating against and sealing one bead of the tire against the escape of air and partially bridging the space between the tire beads, means seating against and supporting the other bead of the tire against axial displacement, said last named means radially adjustable to permit the beads of the tire to slip axially thereover, and expandible means bridging the space between said other tire bead and said first named means to seal against the escape of inflation air pressure from the tire.

2. A quick acting device for mounting and inflating a pneumatic tire comprising annular means sealing against and sealing one bead of the tire against the escape of air and partially bridging the space between the tire beads, means seating against and supporting the other bead of the tire against axial displacement, said last named means radially adjustable to permit the beads of the tire to slip axially thereover, and an inflatable rubber bag bridging the space between said other tire bead and said first named means to seal against the escape of inflation air pressure from the tire.

3. A quick acting device for mounting and inflating a pneumatic tire comprising annular means seating against and sealing one bead of the tire against the escape of air and partially bridging the space between the tire beads, means seating against and supporting the other bead of the tire against axial displacement, expandible means bridging the space between said other tire bead and said first named means to seal against the escape of inflation air pressure from the tire, and stop means in said annular means actuated by the axial motion of said one bead as the tire is slipped onto the chuck for positively positioning said other bead with respect to said expandible means.

4. A quick acting device for mounting and inflating a pneumatic tire comprising an annular base having a radially protruding flange bearing against and supporting one bead of a tire and partially bridging the space between the beads, a radially expandable disc made up of a plurality of segments adapted to retract radially to permit the beads of the tire to slip thereover and to extend radially and seat against the lateral outside surface of the other tire bead, an annular inflatable rubber airbag abutting when inflated said base and the other bead of the tire and adapted upon inflation to press against said other bead and said base to seal the tire cavity against the escape of inflation air, means to inflate said airbag when the tire is mounted on the device, and means in said base for inflating the tire.

5. A quick acting device for mounting and inflating a pneumatic tire comprising an annular base having a radially protruding flange bearing against and supporting one bead of a tire and partially bridging the space between the beads, a radially expandable disc made up of multiple segments adapted to retract radially to permit the beads of the tire to slip thereover and to extend radially and seat against the lateral outside surface of the other tire bead, an annular inflatable rubber airbag abutting said base and the other bead of the tire and adapted upon inflation to expand against said other bead and said base to seal the tire cavity against the escape of inflation air, means to inflate said airbag when the tire is mounted on the device, means in said base for inflating the tire, and means on said base responsive to the positioning of said one bead as the tire is placed on the base and adapted to contact said other bead and position it with respect to said airbag.

6. A quick acting device for mounting and inflating a pneumatic tire comprising an annular base having a radially protruding flange bearing against and supporting one bead of a tire and partially bridging the space between the beads, a radially expandable disc made up of multiple segments adapted to retract radially to permit the beads of the tire to slip thereover and to extend radially and seat against the lateral outside surface of the other tire bead, an annular inflatable rubber airbag abutting said base and the other bead of the tire and adapted upon inflation to expand against said other bead and said base to seal the tire cavity against the escape of inflation air, means to inflate said airbag when the tire is mounted on the device, means in said base for inflating the tire, and pawl pivoted on said base and adapted to contact and position said other bead when said one bead is positioned against said flange.

7. A quick acting device for mounting and inflating a pneumatic tire comprising annular means seating against and sealing one bead of the tire against the escape of air and partially bridging the space between the tire beads, means seating against and supporting the other bead of the tire against axial displacement, expandible means bridging the space between said other tire bead and said first named means to seal against the escape of inflation air pressure from the tire, a pawl pivotally mounted intermediate its ends on said annular means, a spring abutting said annular means and one arm of the pawl to bias that arm radially into abutting relation against the one bead of the tire to thereby lock and position it in its seat on said annular means.

8. A quick acting device for mounting and inflating a pneumatic tire comprising annular means seating against and sealing one bead of the tire against the escape of air and partially bridging the space between the tire beads, means seating against and supporting the other bead of the tire against axial displacement, expandible means bridging the space between said other tire bead and said first named means to seal against the escape of inflation air pressure from the tire, a pawl pivotedly mounted intermediate its ends on said annular means, a spring abutting said annular means and one arm of the pawl to bias that arm radially into abutting relation against the one bead of the tire to thereby lock and position it in its seat on said annular means, a stop on said annular means abutting the arm of the pawl when the radial outer surface of the pawl is flush with the bead seat on the annular means whereby to permit sliding the bead onto the bead seat and radial biasing of the arm into stop position when the bead is seated.

References Cited in the file of this patent

UNITED STATES PATENTS

| | | |
|---|---|---|
| 2,197,808 | Mason | Apr. 23, 1940 |
| 2,367,787 | Lannen | Jan. 23, 1945 |
| 2,399,572 | Powell et al. | Apr. 30, 1946 |
| 2,552,336 | Marcum | May 8, 1951 |
| 2,567,985 | Baker et al. | Sept. 18, 1951 |
| 2,874,759 | Ranallo | Feb. 24, 1959 |

FOREIGN PATENTS

| | | |
|---|---|---|
| 484,115 | Germany | Oct. 11, 1927 |